United States Patent [19]

Sorrells

[11] Patent Number: 5,109,946
[45] Date of Patent: May 5, 1992

[54] APPARATUS FOR PACK-OFF LOCKING OF SEISMIC ENERGY SOURCE
[75] Inventor: Martin Sorrells, Buffalo, Tex.
[73] Assignee: OmniTech Services Inc., Houston, Tex.
[21] Appl. No.: 684,528
[22] Filed: Apr. 11, 1991
[51] Int. Cl.[5] .............................................. G01V 1/40
[52] U.S. Cl. .................................. 181/106; 367/911; 181/104
[58] Field of Search .................. 367/25, 911; 181/104, 181/102, 401, 106; 73/151, 152

[56] References Cited

U.S. PATENT DOCUMENTS

| | | | |
|---|---|---|---|
| 2,651,027 | 9/1953 | Vogel | 367/25 |
| 3,923,099 | 12/1975 | Brandon | 166/250 |
| 4,815,557 | 3/1989 | Duwe | 181/106 |
| 4,817,755 | 4/1989 | Gildas | 181/106 |
| 4,858,718 | 8/1989 | Chelminski | 181/106 |
| 5,005,666 | 4/1991 | Fairborn | 181/102 |

Primary Examiner—Ian J. Lobo
Attorney, Agent, or Firm—Fulbright & Jaworski

[57] ABSTRACT

A pack-off locking means for use in downhole geological seismic work. An upper and lower endcap rigidly connected together by a inelastic vertical member which is adapted to hold a seismic energy source. The endcaps have sealing means attached thereto for isolating a cylindrical section of the well borehole, thus, forming a sealed chamber wherein the seismic energy source contained therein transmits acoustical energy in a mostly horizontal and omni-directional plane into geological formations of interest. Minimal acoustical energy is transmitted into the borehole vertical fluid column because the seal-off means prevents communication thereto. Means for pressurizing the chamber formed by the pack-off means and for measuring the pressure thereof.

8 Claims, 5 Drawing Sheets

APPARATUS FOR PACK-OFF LOCKING OF SEISMIC ENERGY SOURCE

BACKGROUND OF THE INVENTION

1. Field of the Invention

The present invention relates to geophysical exploration and logging operations, and in particular to seismic energy sources used in cross hole tomography and inverse vertical seismic profiling.

2. Description of the Related Technology

Geophysical surveying is used to map underground geological formations for determining where possible oil and gas formations may be located. The use of geophysical surveying to determine the best drilling site increases the probability of finding oil and gas in producing quantities. In addition, geophysical surveying may be used in existing wells to evaluate the well's future life expectancy for producing production quantities of oil and gas, or to tell when secondary or tertiary recovery methods are applicable to wells whose production has decreased.

Geophysical surveying uses sound waves to penetrate through rock, sand, liquid and sandstone formations in the earth, and under certain conditions reflect off the rock formations deep in the ground. These sound waves are produced by mechanical, electrical, or chemical sources which produce sound vibrations at frequencies that can propagate through the different layers of rock and sand, to depths encountered in a geophysical survey. The sound waves from the seismic source are received by geophones which are vibration sensors that convert the mechanical vibrations or audio sounds into electrical signals that may be utilized by geophysical survey computer processing systems.

Surface geophysical surveying uses one or more seismic energy sources, such as a thumper, vibrator, dynamite explosion or other means to generate low frequency vibrations of sufficient amplitude to penetrate deep into the ground in order to reach the formations of interest. Geophone receivers are strategically placed at positions located some distance from the seismic energy source and, normally, are used in great numbers. When a seismic energy source is fired, vibration energy travels from the ground surface, either passing thought the various geophysical formations, or when encountering formation boundary layers between geophysical rock and sand formations, are reflected back to the surface. Geophones are placed at the surface around the seismic energy source in a pattern that will capture any energy vibrations reflected from the underground geophysical formations of interest. All vibrational information received by the geophones is recorded by electronic instruments that may include computer signal processing of the information received. Each geophone or array of geophones may be designated by a seismic recording channel and there may be hundreds of channels so recorded during a geophysical survey.

Using a seismic energy source located on the surface may produce overload of the geophone receivers during the initial seismic energy pulse from the surface energy source. On the other hand, the reflected seismic energy pulse, traveling from the surface to deep subterranean geophysical formations and then being reflected back to the surface located geophone receivers, may not have sufficient energy necessary for proper information retrieval. To overcome these weak seismic reflections, the exploration industry may use a geophysical seismic energy source placed deep in the ground in a borehole. This borehole allows the placement of the seismic energy source closer to the geophysical formations of interest. Putting the seismic energy source closer to the formations of interest and farther away from the surface located geophone receivers increases the strength of the reflected vibration signals that may be received by the surface mounted geophones and reduces geophone overload.

Various forms of seismic energy sources may be used downhole, such as air discharge devices, piezo electric transducers or hydraulic thumpers. However, most of the vibrational energy waves are lost in the borehole fluid column directly above and below the seismic energy source. Only seismic energy waves radiating perpendicular to the borehole, in a mostly horizontal plane, are useful in geophysical exploration. The seismic energy waves traveling through the borehole fluid, vertically up and down, serve no useful purpose in obtaining seismic information. Loss of seismic energy waves in the vertical fluid column may be as high as 95%, thus, only 5% of the seismic energy waves may provide useful information. Therefore, energy sources that produce large magnitudes of vibrational waves are necessary in order to obtain readable information by the surface mounted geophones.

Each seismic energy source has a characteristic energy waveform signature that is very important to know when compiling data from a seismic survey. This signature may comprise the energy source frequency, and pulse amplitude and duration. The signature is also dependant on the pressure and density of the surrounding media.

During a seismic survey, at each energy source point in the borehole, a number of recording may be necessary to achieve the desired signal to noise ratio. These multiple records are vertically stacked by correlation techniques. Thus, it is very important that the source signature be identical for most effective vertical stacking of the multiple records.

The second form of geophysical exploration is cross hole tomography which is used to produce a sectional view of geophysical formations located between two or more borehole wells. A seismic energy source is placed in a borehole and geophone seismic receivers are placed in other borehole wells surrounding the seismic energy source. The depth of geophone receivers are varied so as to take a profile of the geophysical formation that exists between the seismic energy source and the geophone receivers. Very little of the reflected seismic waves are utilized in cross hole tomography, primarily the seismic vibrational waves propagated through the geophysical formations are utilized and these vibrations are higher in frequency than vibrational frequencies that would normally be used for deep geophysical surveys using reflected seismic energy waves. When using a seismic energy source in cross hole tomography, the same problem exists as mentioned above in that most of the seismic energy is lost in the vertical fluid column of the borehole, thus, only a fraction of the energy is radiated horizontally into the geological formations of interest.

Present geophysical survey techniques and equipment require vibrational energy sources capable of supplying great magnitudes of vibrational seismic energy to overcome the substantial energy losses in the borehole vertical fluid column. Useful seismic energy from present technology equipment and methods is produced in an inefficient and costly manner because only a small percentage of the generated vibrational energy may be utilized in obtaining useful information from the geological formations.

SUMMARY OF THE INVENTION

In contrast to the prior art use of downhole seismic energy sources the present invention is designed to reduce the wasted energy traveling up and down the fluid column in a borehole containing the seismic energy source. The present invention may increase useful horizontal seismic energy transmission by a factor of 20 over the prior art. The present invention accomplishes this many fold increase in useful seismic energy output by sealing the seismic energy source from the borehole fluid column above and below where the seismic energy source is located in the borehole.

The present invention encloses the seismic energy source in a chamber having a top and bottom pack-off means rigidly connected together by means of an inelastic vertical member perpendicular to the pack-off means. This inelastic member prevents vertical movement of the top and bottom pack-off means so that when a seismic energy source is placed within the chamber formed by the top and bottom pack-off means of the present invention and the borehole sidewall cylindrical section enclosed therein, the seismic energy source can only transmit vibrational waves to the borehole sidewalls enclosed between the top and bottom pack-off means.

Only minimal vibrational energy can be transmitted vertically above and below the top and bottom pack-off means, respectively, because of the inelastic vertical member rigidly securing the top and bottom pack-off means together. Thus, the seismic energy waves can only propagate horizontally in a radius of 360 degrees through the cylindrical section of the borehole enclosed by the top and bottom pack-off means. Very little seismic energy waves are transmitted vertically into the fluid column, because of the rigid inelastic member preventing the top and bottom pack-off means from moving in the vertical direction. Various types of seismic energy sources may be used with the present invention, for example, a piezo electric sound transducer, a vacuum and/or pressure assisted weight drop thumper, or a downhole vibrator. The type of device determines whether an electrical or a hydraulic energy source is used.

The present invention may be used to maintain a constant chamber pressure in which the seismic source may operate. This constant chamber pressure allows the source signature to be consistent between multiple records taken at the same source point or even for source points that vary along the entire vertical length of interest in the borehole. A constant seismic source signature may be maintained by pressuring the chamber of the invention at a constant pressure irrespective of the external borehole fluid pressure. The seismic source signature also may be changed by varying the chamber pressure. Thus, the quality of the seismic survey may be greatly enhanced by keeping the source signature constant throughout multiple records. The signature may be enhanced by altering the pressure of the medium surrounding the energy source.

Various forms of pack-off means may be used in the present invention. Hydraulically inflatable collars may be utilized in borehole wells having definite sidewall diameters, such as wells using pipe casing. A preferred embodiment of the present invention hydraulically inflates flexible seal collars which then tightly seal off a cylindrical section of the borehole pipe casing. This hydraulically inflatable collar pack-off prevents the borehole well fluids from coming in contact with the seismic energy source, except those fluids contained within the enclosed cylindrical section between the pack-off collars.

Another embodiment of the present invention utilizes a hydraulically inflatable sleeve secured between top and bottom endcaps connected rigidly together by means of an inelastic vertical member. The hydraulically inflatable sleeve inflates by pressure from hydraulic fluid pumped into the chamber formed by the vertical walls of the inflatable sleeve and the top and bottom endcaps at each end of the sleeve. The seismic energy source is located within the inflatable sleeve and between the top and bottom endcaps.

When the hydraulically inflatable sleeve expands to the diameter of the borehole, an enclosed chamber is formed around the seismic energy source. The rigidly connected top and bottom endcaps reduce transmission of the seismic source vibrational waves to the borehole vertical fluid column. Therefore, most of the seismic energy is directed through the hydraulic fluid contained in the inflated sleeve pressing against the sidewall of the borehole.

The embodiment having an inflatable sleeve between endcaps, normally, will be used in a borehole without pipe casing and not having a tightly defined inside diameter. In addition, the inflatable sleeve embodiment may be used in a borehole containing no fluid, i.e. a dry hole. This inflatable sleeve embodiment may use hydraulic inflation pressure, for example, of 50 to 200 pounds per square inch. Minimal vibrational energy may be transmitted to the borehole vertical fluid column because the sleeve wall thickness is greater were it attaches to the endcaps and, thus, will vibrate only minimally where there is a void between the rigid endcaps and the sidewall of the borehole itself.

Another embodiment of the present invention utilizes hydraulically driven wedges as pack-off seals. Each wedge seal is between a fixed and moveable plate. As the moveable plates travel toward the fixed plates, the wedge seals push outwardly against the borehole sidewalls. These wedge type pack-off means function in similar fashion to the hydraulically inflatable collars, however, more seal force may be exerted during the pack-off process than would be possible when using the hydraulically inflatable collar seals.

Yet another embodiment of the present invention uses alternating layers of soft and hard rubber or rubber-like material between the fixed and movable plates. When the movable plates are driven toward the fixed plates the various layers of hard and soft high temperature rubber or rubber like material between the plates compress, pushing the softer rubber seals outwardly against the borehole sidewalls, making an extremely tight seal even over an irregularly shaped wall surface. The seal material has high temperature characteristics. Both the wedge and layer pack-off sealing systems may be easily maintained in the field with relatively inexpensive materials and tools.

An object of the present invention is to increase the amount of useful horizontal seismic energy wave transmission from a seismic energy source in a well borehole.

A further object of the present invention is the use of upper and lower pack-off seal means to enclose a seismic energy source in a borehole, wherein the borehole vertical fluid column, above and below the upper and lower seal means respectively, may be isolated from the seismic energy source. Isolating the seismic energy source in this manner greatly improves the amount of energy transmitted horizontally through the small cylindrical section enclosed between the upper and lower pack-off means into the geophysical formations of interest.

A further object of the present invention is the use of a rigid vertical member securely fastening the top and bottom pack-off seal means so as to minimize vertical movement of the pack-off means. Minimizing vertical movement greatly reduces the amount of vibrational energy imparted into the borehole fluid column.

Yet a further object of the present invention is to pressurize the enclosed chamber formed by the pack-off seal means and the borehole sidewalls to a pressure greater than the borehole fluid column so as to increase the high frequency content of the seismic energy pulse waveform.

Still a further object of the present invention is to pressurize the enclosed chamber formed by the pack-off seal means and the borehole sidewalls to a pressure greater than the borehole fluid column. The chamber pressure is monitored over time to detect for pack-off seal leaks into the surrounding borehole fluid column before using the seismic energy source. Pressure detection may be performed by a differential pressure transducer.

Another object of the present invention is to use a pressure transducer in the enclosed chamber formed by the pack-off seal means and the borehole sidewalls to detect the seismic energy pulse waveform signature for signal analysis correlation purposes.

Still another object of the present invention is to enable a constant pressure within the enclosed chamber formed by the pack-off seal means and the borehole sidewalls so as to maintain a constant seismic energy source signature for improving seismic survey data processing results.

Other and further objects, features and advantages will be apparent from the following descriptions of the invention, presently preferred embodiments, given for the purpose of disclosure and taken in conjunction with the accompanying drawings.

DETAILED DESCRIPTION OF THE PREFERRED EMBODIMENT

Figure 1:
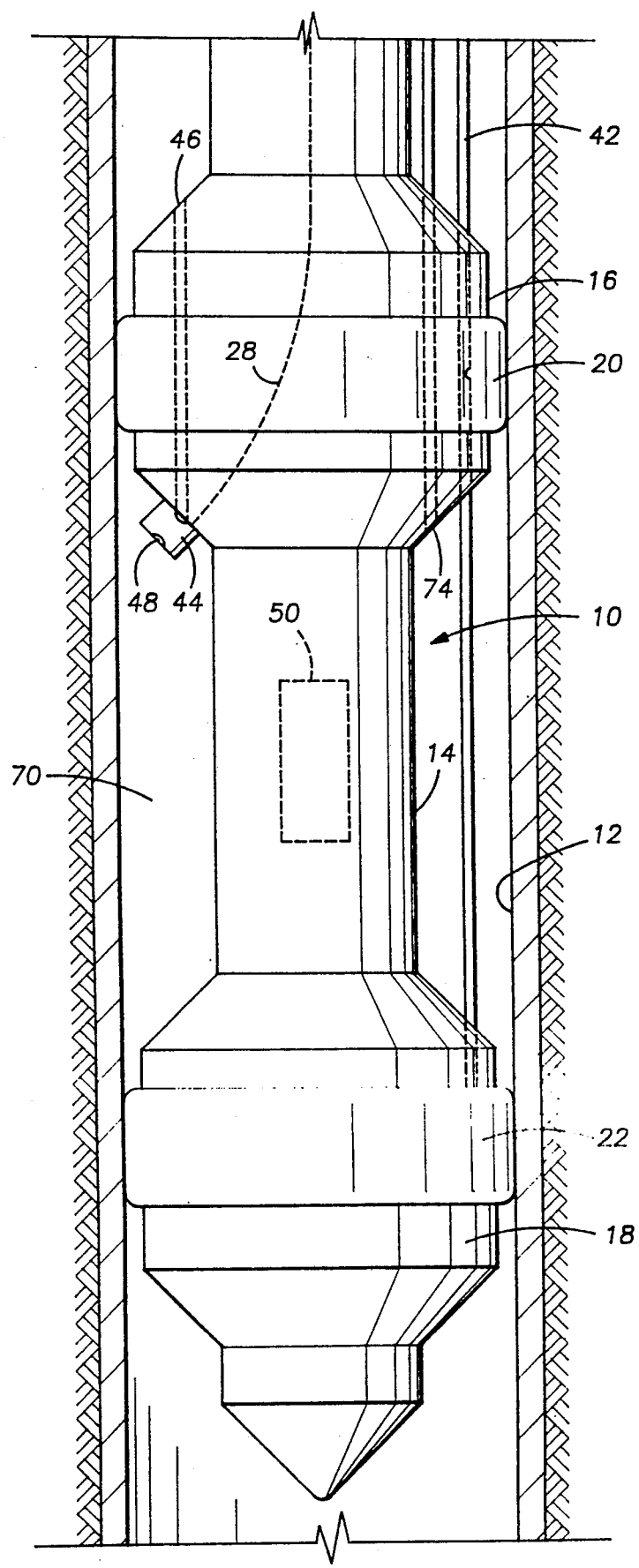
FIG. 1 is a schematic elevational diagram of a preferred embodiment of the pack-off means using hydraulically inflatable seal collars.

Referring now to the drawings, and particularly to FIG. 1, the reference 10 generally indicates a pack-off locking system of the present invention as being enclosed in a well borehole 12. The pack-off locking system 10 comprises a body having a vertical member 14, first and second endcaps 16 and 18, respectively, at opposite ends of the vertical member 14, and first and second sealing means 20 and 22, respectively. Provisions for conventionally holding a suitable seismic energy source 50 are made in vertical member 14 by, for example, threaded coupling or bolting thereto. First and second sealing means 20 and 22, respectively, are attached to the first and second endcaps 16 and 18, respectively.

Pack-off locking system 10 is placed in a well borehole at a depth of interest and contains the seismic energy source 50 attached by conventional means to the vertical member 14 located between the first and second endcaps 16 and 18. When the pack-off locking system 10 reaches the borehole well depth of interest, sealing means 20 and 22 may be inflated by hydraulic fluid pressure from a hydraulic fluid pressure source located in the upper portion of a seismic energy tool (not shown) wherein the hydraulic fluid is in communication with the sealing means 20 and 22 by means of a hydraulic fluid tube 42. Sealing means 20 and 22 press tightly against the well borehole sidewalls 12 when inflated.

In prior seismic energy source systems, fluid in the borehole was in communication with the seismic energy source, resulting in most of the seismic energy being absorbed up and down the vertical liquid column. Most of the seismic energy was lost in the liquid column and resulted in very little useful seismic energy being transmitted horizontally into the geophysical rock formation. In contrast to the prior seismic energy source systems, the pack-off system 10 of the present invention greatly reduces the amount of seismic energy that is lost in the borehole vertical liquid column. The seismic energy source 50 is effectively sealed from the vertical liquid column by the seals 20 and 22 expanded tightly against the borehole walls 12. This greatly reduces vibrational energy losses into the vertical fluid column, thus, resulting in more vibrational energy available for transmission in the horizontal direction through sidewalls 12.

Seismic or acoustic energy can only be transmitted through a medium that can vibrate or move in proportion to the vibrational or acoustical frequencies. Vertical member 14 is rigidly attached to endcaps 16 and 18, all being comprised of inelastic materials such as, for example, stainless steel or high tensile strength steel for use in non-high stress or high stress applications, respectively. Endcaps 16 and 18 are rigidly connected by vertical member 14 and cannot move in relation to each other, therefore, when seismic energy source 50 generates a vibrational signal, very little vibrational energy is transmitted vertically up and down into the borehole fluid column. In addition, seals 20 and 22 prevent the liquid column in borehole 12 from being in communication with the seismic energy source 50. Therefore, minimal vibrational energy can be transmitted to the liquid column above seal 20 and below seal 22. Thus, the major portion of the seismic energy can only be transmitted through the liquid enclosed in a chamber 70 formed by the cylinder of sidewall 12 between seals 20 and 22. In this manner the seismic energy source 50 transmits its vibrational energy horizontally into the geophysical rock formation.

A differential pressure transducer 44 may measure the pressure difference between the borehole fluid and the pressure in chamber 70. Pressure transducer 44 is in communication with the borehole pressure through pressure port 46 and the chamber 70 pressure through pressure port 48. The transducer 44 measures the difference in pressure between ports 46 and 48, then transmits the pressure difference, if any, to a surface pressure indicator or recorder (not shown) by means of signal line 28.

Pressure in the chamber 70 may be increased by injection of pressurized borehole fluid. Pressurized borehole fluid may be injected by means of a pump (not shown) through fluid line 72 and out port 74 into chamber 70. Pressurizing Chamber 70 allows the detection of leaks through seals 20 and 22. Borehole fluid is first injected into chamber 70 until a positive pressure in chamber 70 is measured by transducer 44. The fluid flow is stopped and pressure is measured by transducer 44 over time to determine if positive pressure can be maintained in chamber 70. If pressure can be maintained then seals 20 and 22 have effectively sealed against walls 12. When the chamber 70 is properly sealed, the energy source 50 may be most effectively and efficiently used.

Another purpose of the pack-off system 10 is to allow a seismic energy waveform signature to be recorded for latter use in correlating and processing the seismic data survey results. Transducer 44 may also detect the energy source 50 output pulse waveform, i.e. amplitudes and frequencies. Knowing the vibrational source amplitudes and frequencies of the energy source 50 allows more sophisticated data processing of the received seismic information by means of cross correlation and other forms of signal processing analysis that are well known in the seismic industry.

Yet another purpose of the pack-off system 10 of the present invention allows greatly increased chamber 70 pressures in relation to the well borehole fluid pressures. Increasing the pressure in the chamber 70 may result in even more efficient transfer of acoustical energy from the energy source 50 into the geological formations. In addition, the frequency response of the energy source 50 may be changed or held constant for all source points in the borehole regardless of the actual borehole fluid pressure.

Figure 2A:
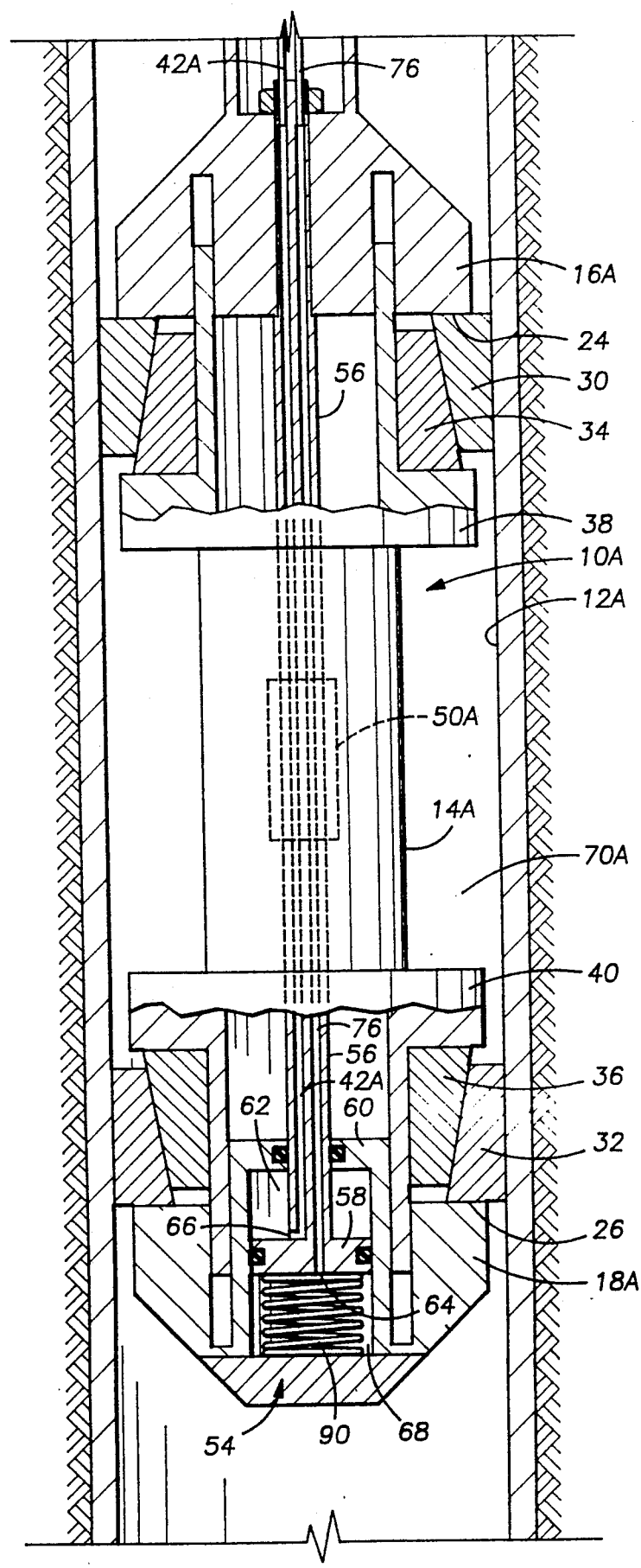
FIGS. 2a, 2b and 2c are schematic elevational diagrams of preferred embodiments of the pack-off means using hydraulically expandable pack-off seal means.
Figure 2B:
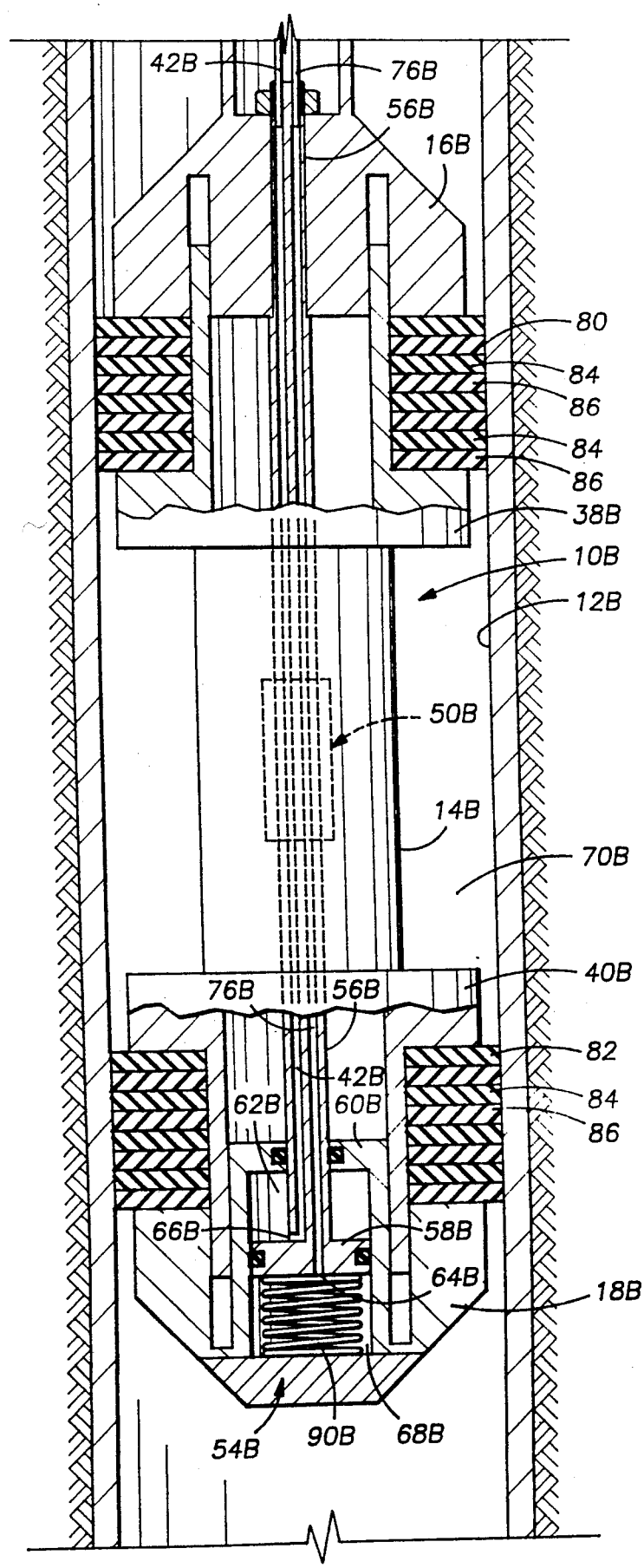
Figure 2C:
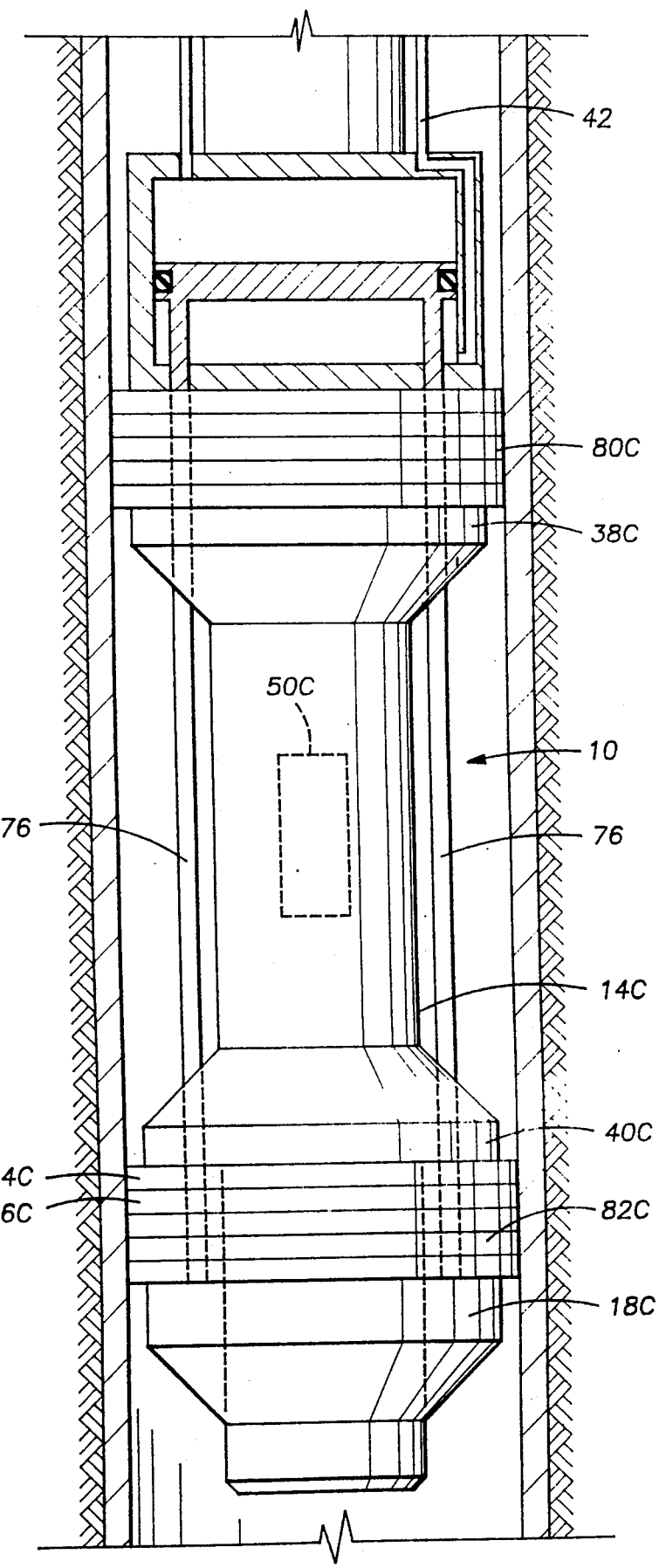

FIGS. 2a, 2b and 2c, illustrate other embodiments of the present invention that use hydraulic-mechanical expansion of the sealing means. Common elements used in FIGS. 1, 2a, 2b or 2c are similarly numbered with the addition of suffixes "a", "b" or "c", respectively. Referring now to FIG. 2a, endcaps 16a and 18a are slidingly attached to vertical member 14a. The vertical member 14a is fixedly attached to fixed plates 38 and 40. Endcaps 16a and 18a each have inner faces 24 and 26, respectively. Wedge seals 30 and 32 are in contact with and surround inner faces 24 and 26, respectively. Seals 30 and 32 are circular in shape. The plates 38 and 40 fixedly hold wedges 34 and 36 in place.

Wedge seals 30 and 32 move toward the plates 38 and 40 when moveable endcaps 16a and 18a are drawn together by means of hydraulic actuator 54. The actuator 54 comprises a connecting rod 56, a piston 58, a sleeve housing 60, hydraulic chambers 62 and 68, and hydraulic fluid entry ports 64 and 66. The housing 60 is fixedly attached to endcap 18a and rod 56 is fixedly attached to endcap 16a. When hydraulic fluid from hydraulic tube 42a enters chamber 62 through port 66, the piston 58 moves away from plate 40. Endcaps 16a and 18a are, thus, drawn toward plates 38 and 40, respectively, forcing wedges 34 and 36 to push outwardly seals 30 and 32, respectively. Seals 30 and 32 create a tight seal-off of the fluid column in borehole 12a and the sealed chamber 70a surrounding the seismic energy source 50a.

Piston 58 may be actuated by means of hydraulic fluid pressure from a hydraulic pressure source (not shown) which transmits hydraulic fluid pressure to the pack-off locking system 10 through the hydraulic tube 42a. The piston 58 may be returned to its unactuated position when pressure is removed from port 66 and applied to port 64 through tube 76 into chamber 68. This action causes rod 56, in conjunction with housing 62, to spread apart endcaps 16a and 18a, releasing wedge seals 30 and 32 from the borehole sidewalls 12a. In the event that the hydraulic pressure system fails, spring 90 will return piston 58 spreading apart endcaps 16a and 18a so that the invention will not be stuck in the borehole.

Referring now to FIG. 2b, another embodiment of the invention is illustrated that uses layered seals 80 and 82. The layered seals 80 and 82 are made up of alternating layers 84 and 86 of hard and soft rubber or rubber like material. The layered seals 80 and 82 are compressed between endcaps 16b and 18b and fixed plates 38b and 40b, respectively, when moveable endcaps 16b and 18b are drawn together by hydraulic actuator 54b. The layered seals 80 and 82 thus expand outwardly to tightly seal against the sidewall 12b. Seals 80 and 82 create a tight seal-off of the fluid column in borehole 12b and the sealed chamber 70b surrounding the seismic energy source 50b.

Referring now to FIG. 2c, yet another embodiment of the invention is illustrated that uses a hydraulic actuator 54c having more than one connecting rod 76. An advantage of using a plurality of connecting rods 76 is that there is more room in vertical member 14c for source 50c. The source 50c may take up the entire inside diameter of member 14c, thus, connecting rods 76 must be located outside and around the vertical member 14c. As described above, the embodiment illustrated in FIG. 2c uses the compression of layered seals 80c and 82c for sealing.

As described in the above embodiments illustrated in FIGS. 2a, 2b and 2c, the tightly sealed chamber enclosing seismic energy source 50a, 50b and 50c only allows vibrational energy waves to propagate through the enclosed fluid contained within the sealed chamber. This seismic energy from the enclosed chamber transmits outwardly through the sidewalls 12 into the geophysical rock formations. As mentioned above, very little seismic or acoustical vibrational energy is transmitted above endcap 16a, 16b and 16c or below endcap 18a, 18b and 18c due to the rigid inelastic vertical member 14a, 14b and 14c preventing any vertical movement into the borehole fluid column.

Figure 3:
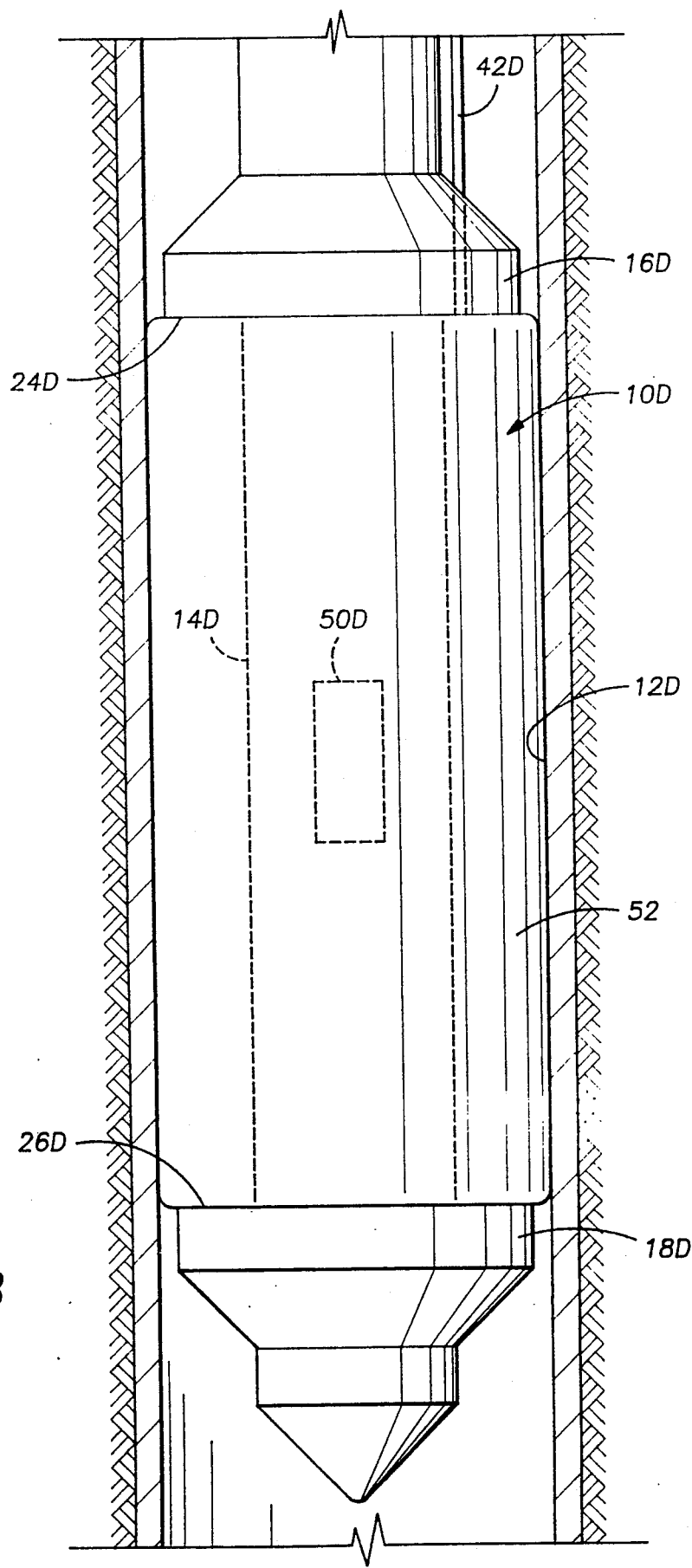
FIG. 3 is a schematic elevational diagram of a preferred embodiment of the pack-off means using a hydraulically inflatable sleeve fixedly attached between two end members.

Referring now to FIG. 3, yet another embodiment of the present invention is illustrated. Elements of this embodiment are numbered the same as similar elements of the other embodiments illustrated in FIGS. 1, 2a, 2b and 2c with the addition of the suffix "d". In this embodiment of the present invention, a rigid member 14d attaches between endcaps 16d and 18d, the member 14d is adapted to hold seismic energy source 50d by, for example, threaded coupling or bolted attachment thereto. The energy source 50d is thus held by the member 14d between endcaps 16d and 18d.

An inflatable sleeve 52 is attached to endcap inner faces 24d and 26d. System 10d is adapted for receiving hydraulic fluid through hydraulic tube 42d from a hydraulic pressure source (not shown). The pressurized hydraulic fluid entering expands the sleeve 52 against borehole inner walls 12d forming a tight seal thereto and preventing the borehole fluid column from coming in communication with the seismic energy source 50d. The embodiment of the present invention illustrated in FIG. 3, may be used in a well borehole that has an irregular diameter such as, for example, in a well not utilizing pipe casing to maintain uniform borehole diameter or in a dry hole. As mentioned above in the embodiments illustrated in FIGS. 1, 2a, 2b and 2c, endcaps 16d and 18d are rigidly held in relation to each other by vertical member 14d, thus, greatly reducing the transmission of vibrational acoustic energy into the fluid column above endcap 16d or below endcap 18d. The inflatable sleeve 52 in conjunction with endcaps 16d and 18d, and borehole walls 12d form an enclosed chamber in which energy source 50d transmits seismic energy waves mostly in the horizontal direction through the enclosing hydraulic fluid and into the geophysical rock formations. In addition, the walls of sleeve 52 may be thicker were they attach to the endcap inner faces 24d and 26d.

All of the above-mentioned embodiments of the present invention may increase the horizontally directed energy directly into the geological rock formations, from the seismic energy source 50, by a factor of twenty (20) over a similar energy source in an unpacked-off borehole. This increase in useful energy results from reducing the wasted seismic energy that heretofore went into the vertical fluid column of the borehole. Sealing the seismic energy source from the borehole fluid column and minimizing vertical movement of both ends of the pack-off means greatly reduces the communication of seismic acoustic wave energies into the borehole fluid. The present invention will greatly increase the transmission efficiencies of seismic energy sources and will enable more cost effective, useful, productive, and reliable geophysical seismic surveying. In addition, new seismic energy sources may be utilized due to the improved energy transfer efficiencies created by the present invention.

The present invention, therefore, is well adapted to carry out the objects and obtain the ends and advantages mentioned, as well as other inherent therein. While several presently preferred embodiments of the invention have been given for the purpose of disclosure, numerous changes in the details of construction and arrangement of parts will readily suggest themselves to those skilled in the art and which are encompassed within the spirit of the invention and the scope of the appended claims.

What is claimed is:

1. In a geophysical survey system using a seismic energy source placed in a well borehole, and a pack-off locking means to enclose the seismic energy source within a sealed chamber formed by the borehole sidewalls and said pack-off locking means, said locking means comprising:
   first and second endcaps each having inner and outer faces;
   a rigid member having first and second ends fixedly attached perpendicular to said first and second endcap inner faces respectively;
   first and second sealing means attached to said first and second endcaps respectively;
   means adapted for holding the seismic energy source between said endcap inner faces; and
   means for expanding said sealing means tightly against the sidewalls of the inner surface of the well borehole, wherein said endcaps and the inner surface of the borehole sidewalls form an isolating chamber containing the seismic energy source which transmits acoustical energy waves mostly in a plane parallel with said endcap faces.

2. The geophysical survey system of claim 1 wherein said sealing means comprises:
   first and second inflatable flexible sealing rings, each of said sealing rings engagingly held circumferentially around the perimeter of each of said endcaps, each of said sealing rings adapted for inflation by hydraulic pressure.

3. The geophysical survey system of claim 1 wherein said sealing means comprises:
   first and second flexibly expandable wedges engagingly held to said first and second endcap outer faces, respectively; and
   first and second wedge actuation means positioned adjacent to said first and second expandable wedges, respectively, causing said first and second wedges, respectively, to outwardly expand against the sidewalls of the borehole, said wedge actuation means adapted to be actuated by hydraulic pressure.

4. The geophysical survey system of claim 1 wherein said sealing means comprises:
   first and second layered seals each comprising a plurality of hard and soft flexible layers of material alternately layered;
   first and second layered seal compression means;
   said first layered seal in communication with and located between said first endcap outer face and said first compression means;
   said second layered seal in communication with and located between said second endcap outer face and said second compression means;
   said compression means biasing said layered seals to outwardly expand against the sidewalls of the borehole; and
   said compression means adapted to be actuated by hydraulic pressure.

5. The geophysical survey system of claim 1 wherein said sealing means comprises:
   a hydraulically inflatable sleeve attached between said endcap inner faces, said sleeve adapted to be inflated by means of hydraulic pressure, wherein said sleeve expands outwardly against the sidewalls of the borehole.

6. The apparatus of claim 1 further comprising:
   a differential pressure transducer having first and second inlet ports;
   said first and second inlet ports in communication with the borehole pressure and the chamber pressure, respectively;
   said pressure transducer measuring the difference between the borehole pressure and the sealed chamber pressure; and
   said pressure transducer adapted for transmitting signals representative of the pressure difference to a means for indicating pressure.

7. The apparatus of claim 1 further comprising:
   a pressure entry port in communication with the inside of the sealed chamber; and
   a pressure line connected to said pressure entry port and adapted to be connected to a pressure means, wherein the pressure means may increase the sealed chamber pressure above the surrounding borehole pressure.

8. The apparatus of claim 1 further comprising:
a pressure entry port in communication with the inside of the sealed chamber;
a pressure line connected to said pressure entry port and adapted to be connected to a pressure means, said pressure means used to keep the sealed chamber pressure constant.

* * * * *